(12) United States Patent
Leber et al.

(10) Patent No.: US 8,789,218 B2
(45) Date of Patent: Jul. 29, 2014

(54) MOLDED ARM FOR SHOWERHEADS AND METHOD OF MAKING SAME

(75) Inventors: Leland C. Leber, Fort Collins, CO (US); Michael J. Quinn, Windsor, CO (US); Harold A. Luettgen, Windsor, CO (US); Roberta L. Callaghan, Fort Collins, CO (US); Carl T. Whitaker, Loveland, CO (US)

(73) Assignee: Water Pik, Inc., Fort Collins, CO (US)

( * ) Notice: Subject to any disclaimer, the term of this patent is extended or adjusted under 35 U.S.C. 154(b) by 595 days.

(21) Appl. No.: 12/112,697

(22) Filed: Apr. 30, 2008

(65) Prior Publication Data

US 2008/0271240 A1  Nov. 6, 2008

Related U.S. Application Data (60) Provisional application No. 60/916,092, filed on May 4, 2007, provisional application No. 60/916,146, filed on May 4, 2007, provisional application No. 60/916,219, filed on May 4, 2007.

(51) Int. Cl.
*E03C 1/042* (2006.01)

(52) U.S. Cl.
USPC ............................................. 4/695

(58) Field of Classification Search
USPC ................................... 4/695, 615
See application file for complete search history.

(56) References Cited

U.S. PATENT DOCUMENTS

| | | |
|---|---|---|
| 203,094 A | 4/1878 | Wakeman |
| 428,023 A | 5/1890 | Schoff |
| 445,250 A | 1/1891 | Lawless |
| 486,986 A | 11/1892 | Schinke |
| 566,410 A | 8/1896 | Schinke |
| 570,405 A | 10/1896 | Jerguson et al. |
| 800,802 A | 10/1905 | Franquist |
| 832,523 A | 10/1906 | Andersson |
| 854,094 A | 5/1907 | Klein |
| 926,929 A | 7/1909 | Dusseau |

(Continued)

FOREIGN PATENT DOCUMENTS

| | | |
|---|---|---|
| AU | 687527 | 11/1996 |
| CA | 659510 | 3/1963 |

(Continued)

OTHER PUBLICATIONS

"Showermaster 2" advertisement, Showermaster, P.O. Box 5311, Coeur d'Alene, ID 83814, as early as Jan. 1997.

*Primary Examiner* — Lori Baker (74) *Attorney, Agent, or Firm* — Dorsey & Whitney LLP (57) ABSTRACT

A molded arm for a showerhead may be configured to connect a showerhead to a fluid supply, and may be in the form of a molded body defining an inlet, an outlet and an interior passage providing fluid communication between the inlet and the outlet. An arm assembly may be configured to connect a showerhead to a fluid supply, and may include: a molded arm body defining an inlet, an outlet and an interior passage providing fluid communication between the inlet and the outlet; and a separate attachment component configured to cooperate with the molded body and to engage a structure connected to a fluid supply. A method of making an arm for connecting a showerhead to a fluid supply may include molding an arm body to define an inlet, an outlet and an interior passage between the inlet and the outlet.

21 Claims, 9 Drawing Sheets

(56) References Cited

U.S. PATENT DOCUMENTS

| | | | |
|---|---|---|---|
| 1,001,842 A | 8/1911 | Greenfield | |
| 1,003,037 A | 9/1911 | Crowe | |
| 1,018,143 A | 2/1912 | Vissering | |
| 1,193,302 A | 8/1916 | Seltner | |
| 1,207,380 A | 12/1916 | Duffy | |
| 1,217,254 A | 2/1917 | Winslow | |
| 1,218,895 A | 3/1917 | Porter | |
| 1,255,577 A | 2/1918 | Berry | |
| 1,260,181 A | 3/1918 | Garnero | |
| 1,276,117 A | 8/1918 | Riebe | |
| 1,284,099 A | 11/1918 | Harris | |
| 1,327,428 A | 1/1920 | Gregory | |
| 1,451,800 A | 4/1923 | Agner | |
| 1,469,528 A | 10/1923 | Owens | |
| 1,500,921 A | 7/1924 | Bramson et al. | |
| 1,560,789 A | 11/1925 | Johnson et al. | |
| 1,597,477 A | 8/1926 | Panhorst | |
| 1,692,394 A | 11/1928 | Sundh | |
| 1,695,263 A | 12/1928 | Jacques | |
| 1,724,147 A | 8/1929 | Russell | |
| 1,736,160 A | 11/1929 | Jonsson | |
| 1,754,127 A | 4/1930 | Srulowitz | |
| 1,758,115 A * | 5/1930 | Kelly | 239/282 |
| 1,778,658 A | 10/1930 | Baker | |
| 1,821,274 A | 9/1931 | Plummer | |
| 1,906,575 A | 5/1933 | Goeriz | |
| 2,011,446 A | 8/1935 | Judell | |
| 2,024,930 A | 8/1935 | Judell | |
| 2,044,445 A | 6/1936 | Price et al. | |
| 2,117,152 A | 5/1938 | Crosti | |
| 2,196,783 A | 4/1940 | Shook | |
| 2,197,667 A | 4/1940 | Shook | |
| 2,268,263 A | 5/1941 | Newell et al. | |
| 2,342,757 A | 2/1944 | Roser | |
| D147,258 S | 8/1947 | Becker | |
| D152,584 S | 2/1949 | Becker | |
| 2,467,954 A | 4/1949 | Becker | |
| 2,472,030 A | 5/1949 | Thulin | |
| 2,546,348 A | 3/1951 | Schuman | |
| 2,581,129 A | 1/1952 | Muldoon | |
| D166,073 S | 3/1952 | Dunkelberger | |
| 2,648,762 A | 8/1953 | Dunkelberger | |
| 2,664,271 A | 12/1953 | Arutunoff | |
| 2,676,806 A | 4/1954 | Bachman | |
| 2,679,575 A | 5/1954 | Haberstump | |
| 2,680,358 A | 6/1954 | Zublin | |
| 2,721,089 A | 10/1955 | Shames | |
| 2,759,765 A | 8/1956 | Pawley | |
| 2,776,168 A | 1/1957 | Schweda | |
| 2,825,135 A | 3/1958 | Tilden | |
| 2,873,999 A | 2/1959 | Webb | |
| 2,931,672 A | 4/1960 | Merritt et al. | |
| 2,966,311 A | 12/1960 | Davis | |
| D190,295 S | 5/1961 | Becker | |
| D192,935 S | 5/1962 | Becker | |
| 3,032,357 A | 5/1962 | Shames et al. | |
| 3,034,809 A | 5/1962 | Greenberg | |
| 3,064,998 A | 11/1962 | Syverson | |
| 3,103,723 A | 9/1963 | Becker | |
| 3,111,277 A | 11/1963 | Grimsley | |
| 3,121,235 A | 2/1964 | Gellmann | |
| 3,143,857 A | 8/1964 | Eaton | |
| 3,196,463 A | 7/1965 | Farneth | |
| 3,231,200 A | 1/1966 | Heald | |
| 3,266,059 A | 8/1966 | Stelle | |
| 3,306,634 A | 2/1967 | Groves et al. | |
| 3,329,967 A | 7/1967 | Martinez et al. | |
| 3,389,925 A | 6/1968 | Gottschald | |
| 3,393,311 A | 7/1968 | Dahl | |
| 3,393,312 A | 7/1968 | Dahl | |
| 3,402,893 A | 9/1968 | Hindman | |
| 3,492,029 A | 1/1970 | French et al. | |
| 3,546,961 A | 12/1970 | Marton | |
| 3,565,116 A | 2/1971 | Gabin | |
| 3,584,822 A | 6/1971 | Oram | |
| 3,612,577 A | 10/1971 | Pope | |
| 3,641,333 A | 2/1972 | Gendron | |
| 3,663,044 A | 5/1972 | Contreras et al. | |
| 3,669,362 A | 6/1972 | Meyerhofer et al. | |
| 3,669,470 A | 6/1972 | Deurloo | |
| 3,685,745 A | 8/1972 | Peschcke-Koedt | |
| 3,731,084 A | 5/1973 | Trevorrow | |
| 3,754,779 A | 8/1973 | Peress | |
| 3,778,610 A | 12/1973 | Wolf | |
| 3,860,271 A | 1/1975 | Rodgers | |
| 3,861,719 A | 1/1975 | Hand | |
| 3,869,151 A | 3/1975 | Fletcher et al. | |
| 3,910,277 A | 10/1975 | Zimmer | |
| D237,708 S | 11/1975 | Grohe | |
| 3,929,164 A | 12/1975 | Richter | |
| 3,931,992 A | 1/1976 | Coel | |
| D240,178 S | 6/1976 | Johansen | |
| D240,322 S | 6/1976 | Staub | |
| 3,971,074 A | 7/1976 | Yxfeldt | |
| 4,005,880 A | 2/1977 | Anderson et al. | |
| 4,006,920 A | 2/1977 | Sadler et al. | |
| 4,023,782 A | 5/1977 | Eifer | |
| 4,045,054 A | 8/1977 | Arnold | |
| D249,356 S | 9/1978 | Nagy | |
| 4,162,801 A | 7/1979 | Kresky et al. | |
| 4,174,822 A | 11/1979 | Larsson | |
| 4,243,253 A | 1/1981 | Rogers, Jr. | |
| 4,258,414 A | 3/1981 | Sokol | |
| 4,274,400 A | 6/1981 | Baus | |
| 4,282,612 A | 8/1981 | King | |
| D262,353 S | 12/1981 | Kitson | |
| 4,358,056 A | 11/1982 | Greenhut et al. | |
| D268,442 S | 3/1983 | Darmon | |
| 4,383,554 A | 5/1983 | Merriman | |
| 4,396,797 A | 8/1983 | Sakuragi et al. | |
| 4,425,965 A | 1/1984 | Bayh, III et al. | |
| 4,465,308 A | 8/1984 | Martini | |
| 4,479,610 A | 10/1984 | Etheridge et al. | |
| 4,495,550 A | 1/1985 | Visciano | |
| 4,540,202 A | 9/1985 | Amphoux et al. | |
| 4,545,081 A | 10/1985 | Nestor et al. | |
| 4,545,535 A | 10/1985 | Knapp | |
| 4,553,775 A | 11/1985 | Halling | |
| D281,820 S | 12/1985 | Oba et al. | |
| 4,568,216 A | 2/1986 | Mizusawa et al. | |
| 4,571,003 A | 2/1986 | Roling et al. | |
| D283,645 S | 4/1986 | Tanaka | |
| 4,643,463 A | 2/1987 | Halling et al. | |
| 4,645,244 A | 2/1987 | Curtis | |
| 4,651,770 A | 3/1987 | Denham et al. | |
| 4,652,025 A | 3/1987 | Conroy, Sr. | |
| 4,669,757 A | 6/1987 | Bartholomew | |
| 4,683,917 A | 8/1987 | Bartholomew | |
| 4,707,770 A | 11/1987 | Van Duyn | |
| 4,717,180 A | 1/1988 | Roman | |
| 4,722,029 A | 1/1988 | Ahle et al. | |
| 4,733,337 A | 3/1988 | Bieberstein | |
| 4,739,801 A | 4/1988 | Kimura et al. | |
| 4,752,975 A | 6/1988 | Yates | |
| 4,790,294 A | 12/1988 | Allred, III et al. | |
| 4,809,369 A | 3/1989 | Bowden | |
| 4,839,599 A | 6/1989 | Fischer | |
| 4,842,059 A | 6/1989 | Tomek | |
| D302,325 S | 7/1989 | Charet et al. | |
| 4,850,616 A | 7/1989 | Pava | |
| 4,856,822 A | 8/1989 | Parker | |
| 4,863,328 A | 9/1989 | Malek | |
| 4,865,362 A | 9/1989 | Holden | |
| 4,871,196 A | 10/1989 | Kingsford | |
| D306,351 S | 2/1990 | Charet et al. | |
| 4,901,765 A | 2/1990 | Poe | |
| 4,901,927 A | 2/1990 | Valdivia | |
| 4,903,178 A | 2/1990 | Englot et al. | |
| 4,907,137 A | 3/1990 | Schladitz et al. | |
| 4,946,202 A | 8/1990 | Perricone | |
| 4,951,329 A | 8/1990 | Shaw | |
| 4,959,758 A | 9/1990 | Filosa et al. | |
| 4,964,573 A | 10/1990 | Lipski | |
| 4,972,048 A | 11/1990 | Martin | |

(56) References Cited

U.S. PATENT DOCUMENTS

| | | |
|---|---|---|
| 4,975,123 A | 12/1990 | Gray |
| D314,246 S | 1/1991 | Bache |
| 5,004,158 A | 4/1991 | Halem et al. |
| 5,022,103 A | 6/1991 | Faist |
| 5,032,015 A | 7/1991 | Christianson |
| 5,033,528 A | 7/1991 | Volcani |
| 5,046,764 A | 9/1991 | Kimura et al. |
| D321,062 S | 10/1991 | Bonbright |
| D322,681 S | 12/1991 | Yuen |
| 5,071,070 A | 12/1991 | Hardy |
| 5,086,878 A | 2/1992 | Swift |
| D325,769 S | 4/1992 | Haug et al. |
| 5,103,384 A | 4/1992 | Drohan |
| 5,107,406 A | 4/1992 | Sekido et al. |
| 5,134,251 A | 7/1992 | Martin |
| 5,135,173 A | 8/1992 | Cho |
| D329,504 S | 9/1992 | Yuen |
| 5,143,123 A | 9/1992 | Richards et al. |
| 5,148,556 A | 9/1992 | Bottoms, Jr. et al. |
| 5,153,976 A | 10/1992 | Benchaar et al. |
| 5,154,483 A | 10/1992 | Zeller |
| 5,163,752 A | 11/1992 | Copeland et al. |
| 5,197,767 A | 3/1993 | Kimura et al. |
| 5,215,338 A | 6/1993 | Kimura et al. |
| 5,220,697 A | 6/1993 | Birchfield |
| D337,839 S | 7/1993 | Zeller |
| D338,542 S | 8/1993 | Yuen |
| 5,254,809 A | 10/1993 | Martin |
| D341,220 S | 11/1993 | Eagan |
| 5,263,646 A | 11/1993 | McCauley |
| 5,265,833 A | 11/1993 | Heimann et al. |
| 5,268,826 A | 12/1993 | Greene |
| 5,276,596 A | 1/1994 | Krenzel |
| 5,286,071 A | 2/1994 | Storage |
| 5,288,110 A | 2/1994 | Allread |
| D345,811 S | 4/1994 | Van Deursen et al. |
| 5,333,787 A | 8/1994 | Smith et al. |
| 5,333,789 A | 8/1994 | Garneys |
| 5,340,165 A | 8/1994 | Sheppard |
| 5,349,987 A | 9/1994 | Shieh |
| 5,356,076 A | 10/1994 | Bishop |
| 5,368,235 A | 11/1994 | Drozdoff et al. |
| 5,369,556 A | 11/1994 | Zeller |
| 5,370,427 A | 12/1994 | Hoelle et al. |
| 5,385,500 A | 1/1995 | Schmidt |
| D356,626 S | 3/1995 | Wang |
| 5,398,977 A | 3/1995 | Berger et al. |
| D361,399 S | 8/1995 | Carbone et al. |
| 5,449,206 A | 9/1995 | Lockwood |
| D363,360 S | 10/1995 | Santarsiero |
| 5,468,057 A | 11/1995 | Megerle et al. |
| D364,935 S | 12/1995 | deBlois |
| D365,625 S | 12/1995 | Bova |
| D365,646 S | 12/1995 | deBlois |
| D366,707 S | 1/1996 | Kaiser |
| D366,708 S | 1/1996 | Santarsiero |
| D366,709 S | 1/1996 | Szymanski |
| D366,710 S | 1/1996 | Szymanski |
| 5,481,765 A | 1/1996 | Wang |
| D366,948 S | 2/1996 | Carbone |
| D367,333 S | 2/1996 | Swyst |
| D367,934 S | 3/1996 | Carbone |
| D368,146 S | 3/1996 | Carbone |
| D368,317 S | 3/1996 | Swyst |
| D368,539 S | 4/1996 | Carbone et al. |
| D368,540 S | 4/1996 | Santarsiero |
| D368,541 S | 4/1996 | Kaiser et al. |
| D368,542 S | 4/1996 | deBlois et al. |
| D369,873 S | 5/1996 | deBlois et al. |
| D369,874 S | 5/1996 | Santarsiero |
| D369,875 S | 5/1996 | Carbone |
| D370,277 S | 5/1996 | Kaiser |
| D370,278 S | 5/1996 | Nolan |
| D370,279 S | 5/1996 | deBlois |
| D370,280 S | 5/1996 | Kaiser |
| D370,281 S | 5/1996 | Johnstone et al. |
| 5,517,392 A | 5/1996 | Rousso et al. |
| 5,521,803 A | 5/1996 | Eckert et al. |
| D370,542 S | 6/1996 | Santarsiero |
| D370,735 S | 6/1996 | DeBlois |
| D370,987 S | 6/1996 | Santarsiero |
| D370,988 S | 6/1996 | Santarsiero |
| D371,448 S | 7/1996 | Santarsiero |
| D371,618 S | 7/1996 | Nolan |
| D371,619 S | 7/1996 | Szymanski |
| D371,856 S | 7/1996 | Carbone |
| D372,318 S | 7/1996 | Szymanski |
| D372,319 S | 7/1996 | Carbone |
| 5,531,625 A | 7/1996 | Zhong |
| D372,548 S | 8/1996 | Carbone |
| D372,998 S | 8/1996 | Carbone |
| D373,210 S | 8/1996 | Santarsiero |
| D373,434 S | 9/1996 | Nolan |
| D373,435 S | 9/1996 | Nolan |
| D373,645 S | 9/1996 | Johnstone et al. |
| D373,646 S | 9/1996 | Szymanski et al. |
| D373,647 S | 9/1996 | Kaiser |
| D373,648 S | 9/1996 | Kaiser |
| D373,649 S | 9/1996 | Carbone |
| D373,651 S | 9/1996 | Szymanski |
| D373,652 S | 9/1996 | Kaiser |
| D374,297 S | 10/1996 | Kaiser |
| D374,298 S | 10/1996 | Swyst |
| D374,299 S | 10/1996 | Carbone |
| D374,493 S | 10/1996 | Szymanski |
| D374,494 S | 10/1996 | Santarsiero |
| D374,732 S | 10/1996 | Kaiser |
| D374,733 S | 10/1996 | Santarsiero |
| 5,567,115 A | 10/1996 | Carbone |
| D376,217 S | 12/1996 | Kaiser |
| D376,860 S | 12/1996 | Santarsiero |
| D376,861 S | 12/1996 | Johnstone et al. |
| D376,862 S | 12/1996 | Carbone |
| 5,624,074 A | 4/1997 | Parisi |
| D379,404 S | 5/1997 | Spelts |
| D381,405 S | 7/1997 | Waidele et al. |
| 5,660,079 A * | 8/1997 | Friedrich ................ 74/471 XY |
| 5,667,146 A | 9/1997 | Pimentel et al. |
| 5,692,252 A | 12/1997 | Zwezdaryk |
| 5,749,602 A | 5/1998 | Delaney et al. |
| 5,778,939 A | 7/1998 | Hok-Yin |
| D398,370 S | 9/1998 | Purdy |
| D401,680 S | 11/1998 | Tiernan |
| 5,865,378 A | 2/1999 | Hollinshead et al. |
| D406,636 S | 3/1999 | Male et al. |
| D413,157 S | 8/1999 | Ratzlaff |
| 5,997,047 A | 12/1999 | Pimentel et al. |
| 6,042,155 A | 3/2000 | Lockwood |
| 6,095,801 A | 8/2000 | Spiewak |
| 6,164,569 A | 12/2000 | Hollinshead et al. |
| 6,164,570 A | 12/2000 | Smeltzer |
| 6,199,729 B1 | 3/2001 | Drzymkowski |
| D440,641 S | 4/2001 | Hollinshead et al. |
| 6,227,456 B1 | 5/2001 | Colman |
| 6,336,764 B1 | 1/2002 | Liu |
| 6,382,531 B1 | 5/2002 | Tracy |
| 6,425,521 B1 | 7/2002 | Wang |
| 6,450,425 B1 * | 9/2002 | Chen ........................ 239/587.4 |
| D465,553 S | 11/2002 | Singtoroj |
| 6,511,001 B1 | 1/2003 | Huang |
| D470,219 S | 2/2003 | Schweitzer |
| 6,537,455 B2 | 3/2003 | Farley |
| 6,626,210 B2 | 9/2003 | Luettgen et al. |
| 6,629,651 B1 | 10/2003 | Male et al. |
| 6,643,862 B2 | 11/2003 | Aitken |
| 6,659,117 B2 | 12/2003 | Gilmore |
| 6,701,953 B2 | 3/2004 | Agosta |
| D496,446 S | 9/2004 | Zwezdaryk |
| D502,761 S | 3/2005 | Zieger et al. |
| 6,863,227 B2 | 3/2005 | Wollenberg et al. |
| 6,926,212 B1 | 8/2005 | Glass |
| D517,669 S | 3/2006 | Zieger et al. |
| 7,066,411 B2 | 6/2006 | Male et al. |
| D529,151 S | 9/2006 | Macan et al. |

(56) References Cited

U.S. PATENT DOCUMENTS

| | | | |
|---|---|---|---|
| D531,259 S | 10/2006 | Hseih | |
| 7,147,172 B2 | 12/2006 | Darling, III et al. | |
| 7,201,331 B2 | 4/2007 | Bertrand | |
| 7,299,510 B2 | 11/2007 | Tsai | |
| 8,070,076 B2 | 12/2011 | Erickson et al. | |
| 2002/0033424 A1 | 3/2002 | Rivera et al. | |
| 2002/0070292 A1 | 6/2002 | Hazenfield | |
| 2004/0163169 A1* | 8/2004 | Kollmann et al. | 4/615 |
| 2005/0082824 A1 | 4/2005 | Luettgen et al. | |
| 2005/0283904 A1 | 12/2005 | Macan et al. | |
| 2006/0151632 A1 | 7/2006 | Larsen | |
| 2006/0208111 A1 | 9/2006 | Tracy et al. | |
| 2006/0231648 A1 | 10/2006 | Male et al. | |
| 2007/0119980 A1 | 5/2007 | Somerfield et al. | |
| 2007/0251590 A1 | 11/2007 | Weinstein | |
| 2007/0272312 A1* | 11/2007 | Chang | 137/606 |
| 2008/0083844 A1 | 4/2008 | Leber et al. | |
| 2011/0139900 A1 | 6/2011 | Somerfield et al. | |

FOREIGN PATENT DOCUMENTS

| | | |
|---|---|---|
| CA | 2150317 | 11/1995 |
| DE | 352813 | 5/1922 |
| DE | 854100 | 10/1952 |
| DE | 2360534 | 6/1974 |
| DE | 2806093 | 8/1979 |
| DE | 3246327 | 12/1982 |
| DE | 4034695 | 5/1991 |
| DE | 4142198 | 4/1993 |
| DE | 19608085 | 3/1998 |
| EP | 0167063 | 6/1985 |
| EP | 0683354 | 11/1995 |
| EP | 0687851 | 12/1995 |
| EP | 0695907 | 2/1996 |
| EP | 0721082 | 7/1996 |
| FR | 538538 | 6/1922 |
| FR | 1098836 | 8/1955 |
| FR | 2596492 | 10/1987 |
| FR | 2695452 | 3/1994 |
| GB | 3314 | 0/1914 |
| GB | 10086 | 0/1893 |
| GB | 129812 | 7/1919 |
| GB | 204600 | 10/1923 |
| GB | 634483 | 3/1950 |
| GB | 971866 | 10/1964 |
| GB | 2156932 | 10/1985 |
| GB | 2298595 | 9/1996 |
| IT | 327400 | 7/1936 |
| IT | 350359 | 7/1937 |
| JP | S63-181459 | 11/1988 |
| JP | H2-78660 | 6/1990 |
| NL | 8902957 | 6/1991 |
| WO | WO93/12894 | 7/1993 |
| WO | WO93/25839 | 12/1993 |
| WO | WO96/23999 | 8/1996 |
| WO | WO98/30336 | 7/1998 |

\* cited by examiner

MOLDED ARM FOR SHOWERHEADS AND METHOD OF MAKING SAME

CROSS-REFERENCE TO RELATED APPLICATIONS

This application claims the benefit under 35 U.S.C. §119 (e) of provisional patent application No. 60/916,092, filed May 4, 2007 and entitled "Molded Arm for Showerheads and Method of Making Same"; provisional patent application No. 60/916,219, filed May 4, 2007 and entitled "Hidden Pivot Attachment For Showers And Method Of Making Same"; and provisional patent application No. 60/916,146, filed May 4, 2007 and entitled "Low Flow Showerhead And Method Of Making Same," the disclosures of which are hereby incorporated herein in their entireties.

INCORPORATION BY REFERENCE

This application is related to copending patent application Ser. No. 11/669,132, filed Jan. 30, 2007, and entitled "Handheld Showerhead with Mode Control and Method of Selecting a Handheld Showerhead Mode", the entire disclosure of which is incorporated herein by reference. This application is also related to copending patent application Ser. No. 12/112,751, entitled "Hidden Pivot Attachment For Showers And Method Of Making Same," and copending patent application Ser. No. 12/114,304, entitled "Low Flow Showerhead And Method Of Making Same," the entire disclosures of which are incorporated herein by reference.

BACKGROUND OF THE INVENTION

The inventive filed relates generally to arms for connecting showerheads to a water source. In particular, the inventive field relates to molded arms for showerheads.

Various arms for connecting showerheads to a water source are known. Conventional arms typically comprise machined metal parts that are brazed together and electroplated. Such conventional arms typically include knobs, nuts, threaded rods, tubes, seals, etc., which are assembled together to form a functional arm.

SUMMARY

While conventional arms may be functionally adequate, they may lack an aesthetic appearance, for example, being relatively function-oriented in appearance. Also, conventional arms may be relatively expensive to manufacture, for example, because of costs of materials and complexity of design.

There is a need to provide an arm for a showerhead that is more aesthetic. Thus, there is also a need to provide a method of making a more aesthetic arm for a showerhead.

There is also a need to reduce the costs of manufacturing an arm for a showerhead.

In general, there is a need to provide an arm for a showerhead that is relatively easy to install, relatively easy to maintain, and/or relatively easy to adjust.

Various embodiments as described herein may address such needs. In particular, various embodiments as described herein may provide a molded arm for a showerhead. Such an approach may reduce costs of manufacture, may allow enhanced aesthetics and freedom in design, and/or may allow easier installation, maintenance and/or adjustment.

Various embodiments may provide an arm for connecting a showerhead to a fluid supply. In some embodiments, the arm may comprise a molded body that defines an inlet, an outlet and at least one interior passage providing fluid communication between the inlet and the outlet.

Various embodiments may provide a method of making an arm for connecting a showerhead to a fluid supply. In some embodiments, the method may comprise molding an arm body to define an inlet, an outlet and at least one interior passage providing fluid communication between the inlet and the outlet.

Various embodiments may provide an arm assembly for connecting a showerhead to a fluid supply. In some embodiments, the arm assembly may comprise: a molded arm body that defines an inlet, an outlet and at least one interior passage providing fluid communication between the inlet and the outlet, and at least one separate attachment component configured to cooperate with the molded body and to engage a structure connected to a fluid supply.

While multiple embodiments are disclosed, still other embodiments will become apparent to those skilled in the art from the following detailed description, which shows and describes illustrative embodiments. As will be realized, modifications in various aspects are possible, all without departing from the spirit and scope of the present disclosure. Accordingly, the drawings and detailed description are to be regarded as illustrative in nature and not restrictive.

DETAILED DESCRIPTION

Although the following description is provided with respect to particular designs of showerheads, arm assemblies, arms and fluid source structures, it should be understood that such description is for ease of understanding and not meant to be exhaustive or limiting. As such, any known or hereafter developed showerhead and/or fluid source structure is contemplated. Further, the design of the arm assembly and/or arm may be varied as desired to comply with the particular showerhead and/or fluid source structure being used, or as desired for aesthetic purposes.

In general, embodiments as described herein may provide a molded arm for connecting a showerhead to a fluid source. The molded arm may be monolithic, i.e., a single integral structure, or may be formed by separate molded portions that are joined together, for example, by snap fastening or threaded engagement. The molded arm may comprise a molded body that defines an inlet, an outlet and at least one interior passage providing fluid communication between the inlet and the outlet. Any suitable molding technique, such as injection molding, blow molding, gas-assisted molding, rotational molding, etc., may be used.

In some embodiments, the molded body may comprise a first molded portion and a second molded portion, with the inlet defined in the first molded portion, the outlet defined in the second molded portion, and the interior passage defined by the first and second molded portions when joined together. In some embodiments, the molded body may define a plurality of interior passages that provide fluid communication between the inlet and the outlet.

Figure 1:
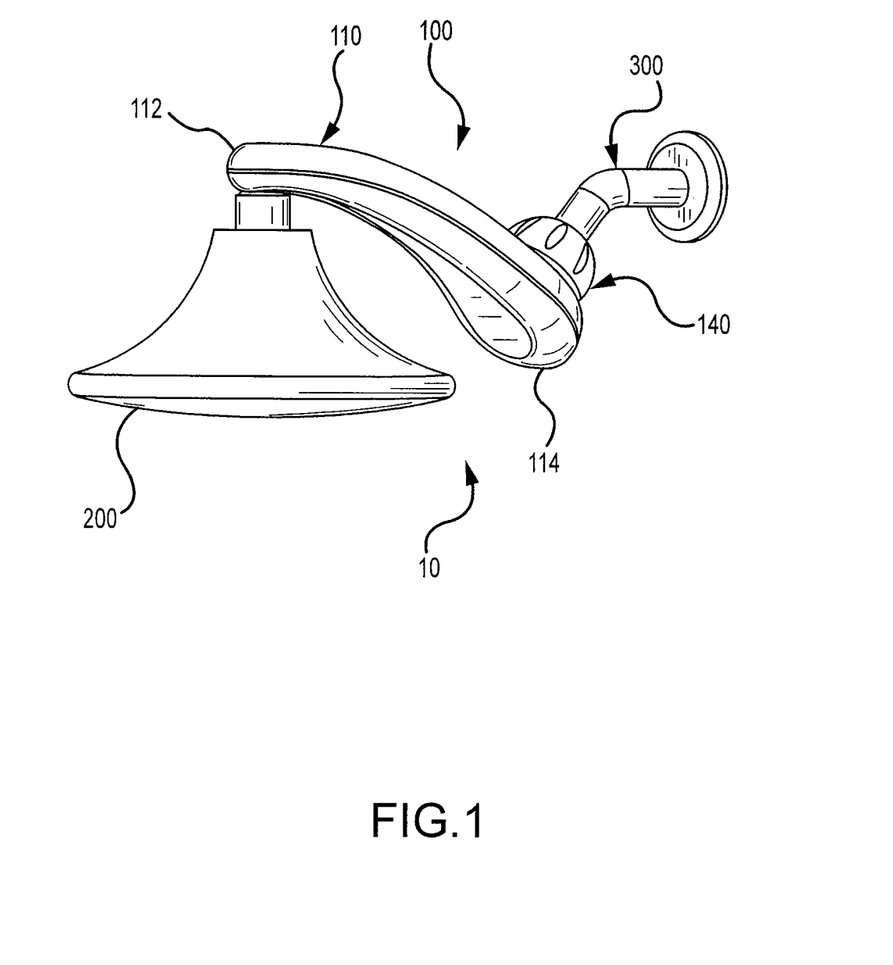
FIG. 1 is a perspective view of an example of a showerhead assembly.

Various details regarding the arms, arm assemblies and methods contemplated will be understood from the description of the examples shown in the figures. With reference to FIG. 1, an example of a showerhead assembly 10 may include a showerhead 200, a fluid supply structure 300 and an arm assembly 100 that connects the showerhead 200 to the fluid supply structure 300 so that a fluid may flow from a fluid supply (not shown) and out of the showerhead 200. The showerhead 200 may be any known or hereafter developed showerhead that is suitable for connection to an arm and/or fluid supply structure. Also, the fluid supply structure 300 may be any known or hereafter developed structure designed to communicate with a fluid supply. Thus, no further description is provided herein.

To connect to the fluid supply structure 300, the arm assembly 100 may include a separate attachment component 140, as described in detail below. As also described below, the arm assembly 100 may include an attachment feature that is configured to cooperate with a corresponding feature of the showerhead 200 to form a suitable connection.

The arm assembly 100 may comprise a molded arm body 110. The molded arm body 110 may be molded of a plastics material, and may be monolithic, i.e., a single integral structure. Alternatively, the molded arm body 110 may be formed by separate molded portions that are joined together.

Figure 2:
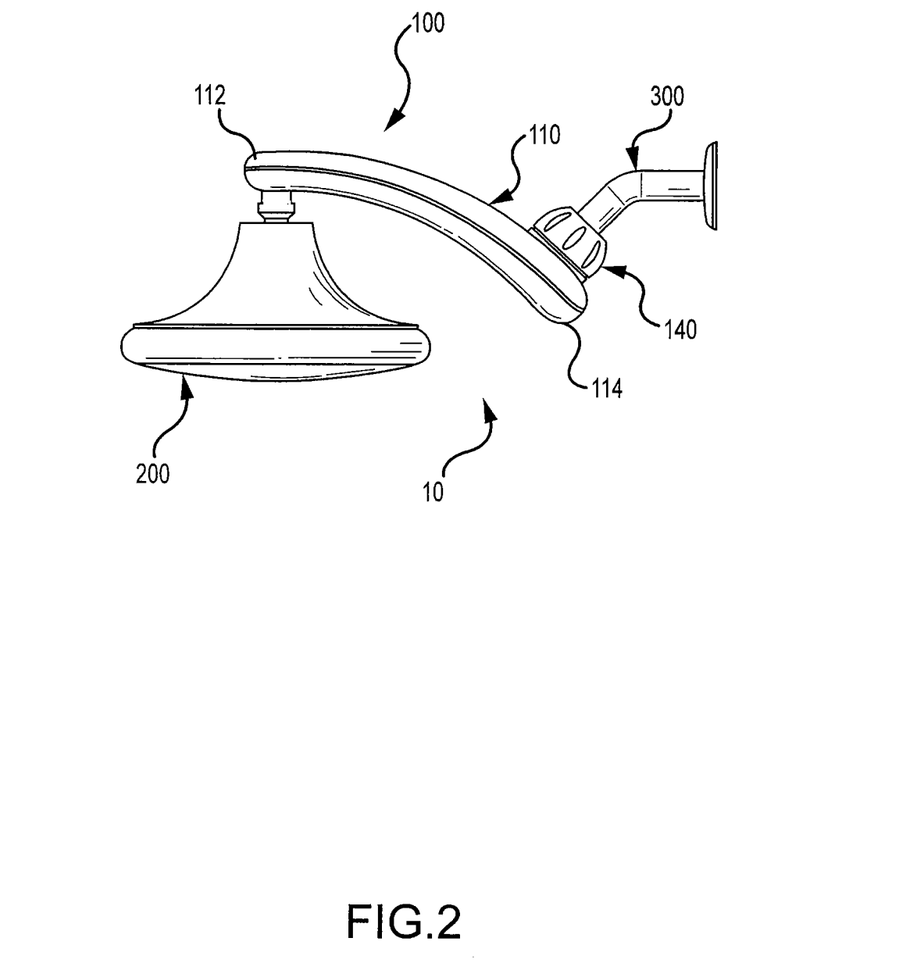
FIG. 2 is a side elevation view of the showerhead assembly of FIG. 1.

For example, as illustrated in FIGS. 1 and 2, the molded arm body 110 may comprise a first body portion 112 and a second body portion 114, which may be joined together in any suitable manner, such as by heat-welding, sonic-welding, adhesive, friction-fitting, mechanical-fitting, etc. Mechanical-fitting may include, but is not limited to, snap-fastening and threaded engagement. The joining of the first and second body portions 112, 114 may be designed to limit or prevent fluid leakage from the molded arm body 110. Alternatively or additionally, the joining of the first and second body portions 112, 114 may be designed to provide a desired aesthetic appearance, such as a distinct joint line or a smooth transition.

Figure 3:
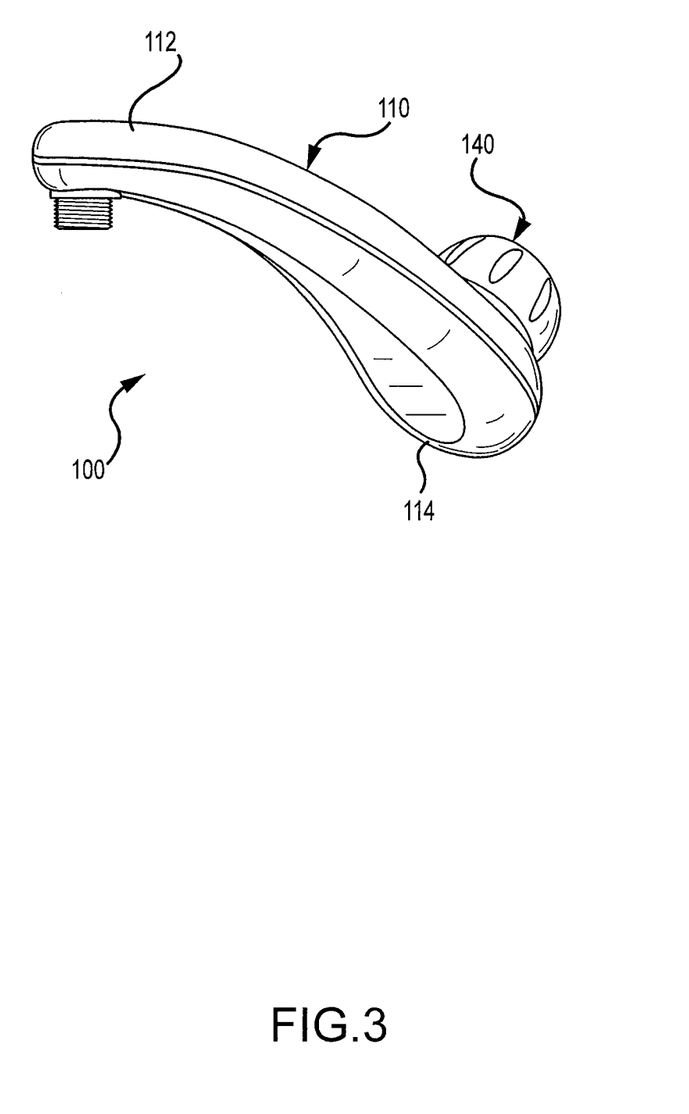
FIG. 3 is a perspective view of the arm assembly of the showerhead assembly of FIG. 1.

FIG. 3 illustrates the arm assembly 100 in isolation. As will be appreciated from FIG. 3, the molded arm body 110 may include various aesthetic features. In particular, the overall shape of the molded arm body 110 may be virtually limitless because of the design flexibility of modern molding techniques. Further, various exterior features may be molded on the surface of the molded arm body 110, such as textures, designs, faux joints, etc.

Figure 4:
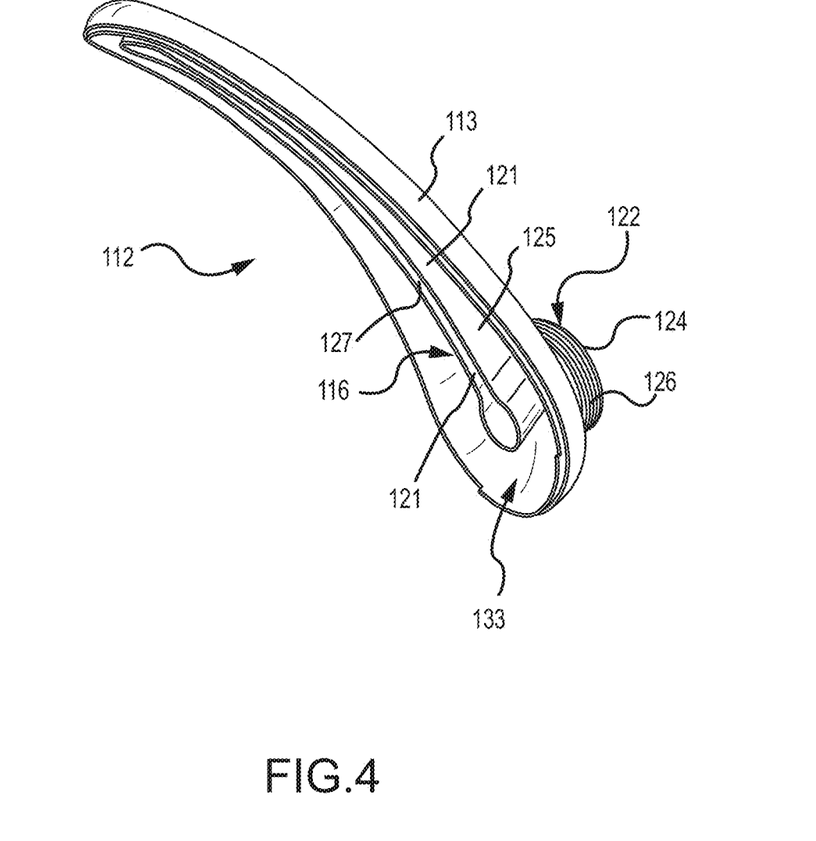
FIG. 4 is a perspective view of an upper half of the arm of the arm assembly of FIG. 3.
Figure 5:
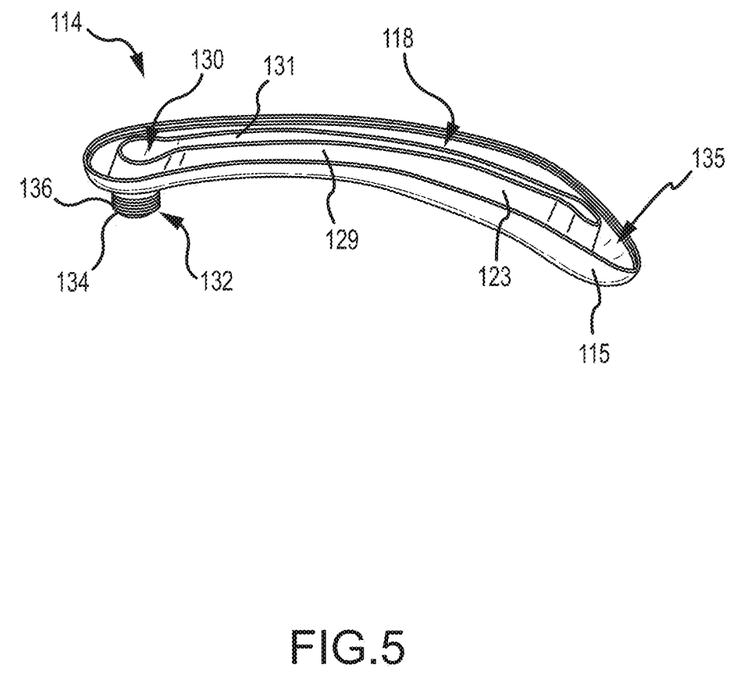
FIG. 5 is a perspective view of a lower half of the arm of the arm assembly of FIG. 3.

As discussed above, the molded arm body 110 may formed by separate molded portions that are joined together, such as a first body portion 112 and a second body portion 114. As illustrated in FIGS. 4 and 5, respectively, the first body portion 112 may comprise an upper portion and the second body portion 114 may comprise a lower portion.

With reference to FIG. 4, the first body portion 112 or first shell may define an inlet 120 situated proximate one end of the first body portion 112. The first body portion 112 also may include a first sidewall 121 having a first surface 127 and a second surface 125. The first surface 127 of the first sidewall 121 defines a first channel 116 that is in fluid communication with the inlet 120. The second surface 125 of the first sidewall 121 in combination with an outer wall 113 of the first body portion 112 may define a spacing channel 133 or a void space between the first channel 116 and the outer wall 113.

With reference to FIG. 5, the second body portion 114 or second shell may define an outlet 130 situated proximate one end of the second body portion 112, for example, opposite the end of the first body portion 112 defining the inlet 120. The second body portion 114 also may include a second sidewall 123 having a third surface 131 and a fourth surface 129. The third surface 131 defines a second channel 118 that is in fluid communication with the outlet 130. The fourth surface 129 of the second sidewall 123 in combination with an outer wall 115 of the second body portion 114 may define a spacing channel 135 or void space between the second channel 118 and the outer wall 115.

It should be understood that the locations of the inlet 120 and/or outlet 130 may be selected as desired for a particular design or application, and need not be located proximate an end of the respective body portion. Further, it should be understood that the inlet 120, the outlet 130 and the first and second channels 116, 118 need not be longitudinally aligned or centered as illustrated, although such a configuration may be desired for aesthetic appearance and/or for weighting balance.

The first and second body portions 112, 114 may be separately molded and then joined to form the molded arm body 110, as shown in FIG. 3. To join the first and second body portions 112, 114, the sidewalls 121, 123 of the first and second channels 116, 118 may be connected, for example, in a leaktight manner, to define a fluid passage and optionally a void passage 137 or space (see FIG. 6) created by the combination of the spaces 133, 135. In particular, the peripheral edges of the first and second channels 116, 118 may be connected together with the combination of the first surface 127 of the first sidewall 121 and the third surface 131 of the second sidewall 123 defining the fluid channel and the combination of the outer wall 113, the second surface 125 of the first sidewall 121, the outer wall 115, and the fourth surface 129 of the second sidewall 123, defining the void passage 137. Alternatively or additionally, the first and second body portions 112, 114 may be joined using the peripheral edges thereof.

As discussed above, the first and second channels 116, 118 may be joined together in any suitable manner, such as by heat-welding, sonic-welding, adhesive, friction-fitting, mechanical-fitting, etc. For example, the first and second channels 116, 118 may be welded or glued together. Alternatively or additionally, the first and second channels 116, 118 may be fitted together by friction-fit or snap-fit or using any suitable mechanical connection, such as mortise and tenon, tongue and groove, etc. on the peripheral edges. Further, a seal or gasket may be employed between the first and second channels 116, 118. This may be in combination with any of the foregoing joining techniques, or may provide the only connection between the first and second channels 116, 118, for example, when the first and second body portions 112, 114 are joined using the peripheral edges thereof.

The molded arm body 110 may be electroplated after joining. In such case, the joint between the first and second body portions 112, 114 may provide a gap or open reveal to allow the inside surfaces of the molded arm body 110 to be electroplated and provide drainage of the electroplating material.

Alternatively, the first and second body portions 112, 114 may be separately electroplated before being joined. In such case, a mask may be provided on the portions of the first and second body portions 112, 114 that are to be connected when the first and second body portions 112, 114 are joined. The mask may prevent electroplating of such portions to allow the first and second body portions 112, 114 to be properly joined.

Although the first and second body portions 112, 114 are sown as including respective channels 116, 118, it should be understood that only one channel may be employed to define the fluid passage. For example, the second body portion 114 may include the second channel 118, while the first body portion 112 does not include a channel, but includes a structure configured to cooperate with the second channel 118 to define the passage when the first and second body portions 112, 114 are joined. For example, the structure may comprise a surface on the interior of the first body portion 112.

Further, although the peripheral edges of the first and second body portions 112, 114 and the first and second channels 116, 118 are shown as being disposed along a common curved plane, it should be understood that any suitable mating configuration may be employed. For example, the peripheral edge of the first channel 116 may be recessed relative to the peripheral edge of the first body portion 112 and the peripheral edge of the second body portion 114 may be recessed a corresponding amount relative to the peripheral edge of the second channel 118.

Such a configuration may allow an upper interior surface of the first body portion 112 to serve as the structure configured to cooperate with the second channel 118 to define the passage when the first and second body portions 112, 114 are joined. In such case, the upper interior surface of the first body portion 112 may include an additional feature configured to cooperate with the peripheral edge of the second channel 118 to facilitate connection. For example, such an additional feature may comprise a groove into which the peripheral edge of the second channel 118 may be fitted. A seal may be disposed in the groove, or a seal may be fitted to the peripheral edge of the second channel 118 without the upper interior surface of the first body portion 112 including a groove.

Such a configuration may also help facilitate joining of the first and second body portions 112, 114, for example, by providing multiple planes of alignment. Also, when the joint of the fluid passage is formed on an upper half, for example, the risk of leakage from the fluid passage may be reduced, in particular for fluid that remains in the fluid passage once fluid flow is stopped.

Alternative forms of the fluid passage are also contemplated. For example, a closed fluid passage such as tubing may be disposed in the channel(s) and placed in fluid communication with the inlet 120 and the outlet 130. Alternatively, no channels may be provided in either of the first and second body portions 112, 114, allowing the tubing to be disposed in a chamber formed between the first and second body portions 112, 114 once joined. Of course, providing one or more channels in either or both of the first and second body portions 112, 114 may avoid use of an additional part to form the fluid passage, and may simplify manufacture by avoiding assembly of the additional part to the inlet 120 and the outlet 130.

Further, the entire chamber formed between the first and second body portions 112, 114 once joined may define the fluid passage. However, certain design considerations may be particularly important in such case. For example, in general, it may be desirable to reduce or minimize the size of the fluid passage to avoid unnecessary weight, in particular, when the fluid passage is filled with fluid. Also, it may be desirable to reduce or minimize the size of the fluid passage to reduce or minimize an amount of fluid that may remain in the fluid passage once fluid flow is stopped, which amount may be released from the fluid passage as an undesirable drip.

When the molded arm body 110 is to be monolithic, the fluid passage may be defined during the molding process, using any known or hereafter developed molding technique. For example, the mold may include an internal feature that may be removed from the molded material when the mold is opened. Various molding techniques are known for creating internal spaces or passages.

Further, the fluid passage may be provided as a separate part that is inserted into a monolithic arm body or between two body portions before joining. Such a fluid passage may be separately molded using any suitable molding technique.

Referring again to FIG. 4, the first body portion 112 may define a first attachment feature 122 that is configured to allow the molded arm body 110 to be connected to the fluid supply structure 300. The first attachment feature 122 may be defined to surround the inlet 120, and may comprise an annular structure 124 that extends outwardly from the main portion of the first body portion 112. The annular structure 124 may include a mechanical connector 126, such as threads as shown. Any suitable mechanical connector may be employed, such as a snap-fit structure. Alternatively or additionally, a friction fit or other manner of attachment, such as welding or gluing, may be employed for the annular structure 124.

Referring again to FIG. 5, the second body portion 114 may define second attachment feature 132 that is configured to allow the molded arm body 110 to be connected to the showerhead 200. The second attachment feature 132 may be defined to surround the outlet 130, and may comprise an annular structure 134 that extends outwardly from the main portion of the second body portion 114. As above, the annular structure 134 may include a mechanical connector 136, such as threads, or any other suitable mechanical connector. Alternatively or additionally, a friction fit or other manner of attachment, such as welding or gluing, may be employed for the annular structure 134.

Figure 6:
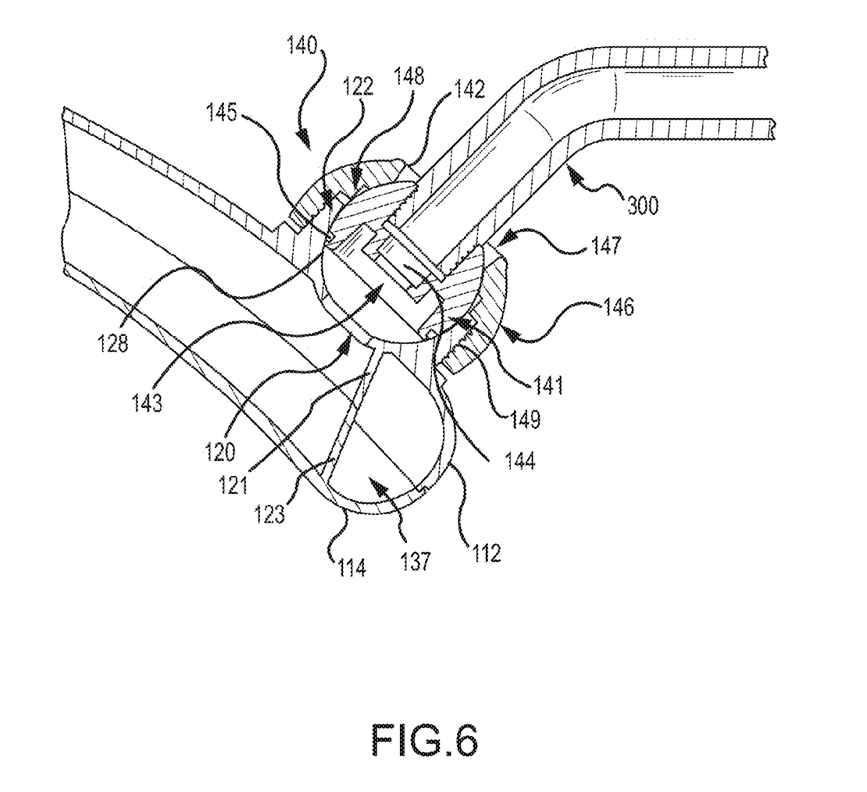
FIG. 6 is a partial enlarged cross-sectional view of the showerhead assembly of FIG. 1.

FIG. 6 illustrates details of the first attachment feature 122 and the attachment component 140, in one example. Additional details are discussed in the incorporated provisional Patent Application Ser. No. 60/916,219.

As shown in cross-section, the attachment component 140 may comprise a pivot ball 141 that is configured to be connected to the fluid supply structure 300. The pivot ball 141 may define an attachment feature 142, such as a threaded bore, that allows a passage 143 in the pivot ball 141 to be placed in open fluid communication with the fluid supply structure 300. The pivot ball 141 may include a space 144 for a suitable flow regulator. The pivot ball 141 also may include a seal 145, such as an o-ring, which may be partially disposed in a groove as shown.

The attachment component 140 may further comprise a collar or nut 146. The collar 146 may define a first opening 147 configured to fit over the fluid supply structure 300 with a desired gap or amount of play, as discussed further below. The collar 146 may define a second opening 148 configured to cooperate with the first attachment feature 122 of the first body portion 112. In particular, the collar 146 may include an attachment feature 149 that corresponds to the first attachment feature 122. For example, complementary threads are shown on the collar 146.

The collar 146 may be installed on the fluid supply structure 300 prior to the pivot ball 141 such that the collar 146 is retained on the fluid supply structure 300 by the pivot ball 141. The first attachment feature 122 of the first body portion 112 may then be connected to the collar 146 to connect the molded arm body 110 to the fluid supply structure 300 in an adjustable manner.

In particular, the connection provided by the collar 146 may be tightened sufficiently to hold the molded arm body 110 in a desired position relative to the fluid supply structure 300. The connection provided by the collar 146 may be loosened sufficiently to allow the molded arm body 110 to be adjusted or repositioned relative to the fluid supply structure 300, and then retightened to hold the molded arm body 110 in the adjusted or new position. It will be understood that such a configuration may provide an omni-directional adjustment that is governed by the size of the gap or amount of play between the first opening 147 of the collar 146 and the fluid supply structure 300.

As illustrated in FIG. 6, the first attachment feature 122 may include an inner surface 128 configured to cooperate with the pivot ball 141. For example, the inner surface 128 may be configured to guide movement of the pivot ball 141 while being loosely held by the collar 146 and the inner surface 128. Alternatively or additionally, the collar 146 may include such an inner surface, as shown. It should be understood, however, that the pivot ball 141 may be allowed to move without such an inner surface and may be held tightly by contact points on the collar 146 and the first attachment feature 122 formed other than by respective curved inner surfaces.

The seal 145 may be configured to function, for example, by being compressed slightly between the pivot ball 141 and the inner surface 128 of the first attachment feature 122. Thus, the seal 145 may be configured to function when the connection provided by the collar 146 may be tightened sufficiently to hold the molded arm body 110 in a desired position, or even when the connection provided by the collar 146 may be loosened sufficiently to allow the molded arm body 110 to be adjusted or repositioned. Further, the seal 145 may be positioned in any suitable location, such as between the collar 146 and the pivot ball 141 or between the collar 146 and the first attachment feature 122.

Other embodiments of the attachment component 140 and/or the first attachment feature 122 are contemplated as well. For example, the pivot ball 141 may be replaced with a cylinder that is axially aligned with a longitudinal axis of the fluid supply structure 300 to provide a rotational adjustment of the molded arm body 110 about the axis of the cylinder. Alternatively, the pivot ball 141 may be replaced with a cylinder that is axially aligned perpendicular to the longitudinal axis of the fluid supply structure 300 to provide a pivotal adjustment of the molded arm body 110 about the axis of the cylinder.

While the foregoing description is provided in terms of upper and lower portions of the molded arm body, it should be understood that the portions may be left and right portions as well. In such case, one or both of the left and right portions may define the inlet, the outlet and the first and second attachment features. Thus, it should also be understood that the upper and lower or left and right portions need not be "halves" and may be designed to be joined in a suitable manner that such features are defined, before or after joining.

Figure 7:
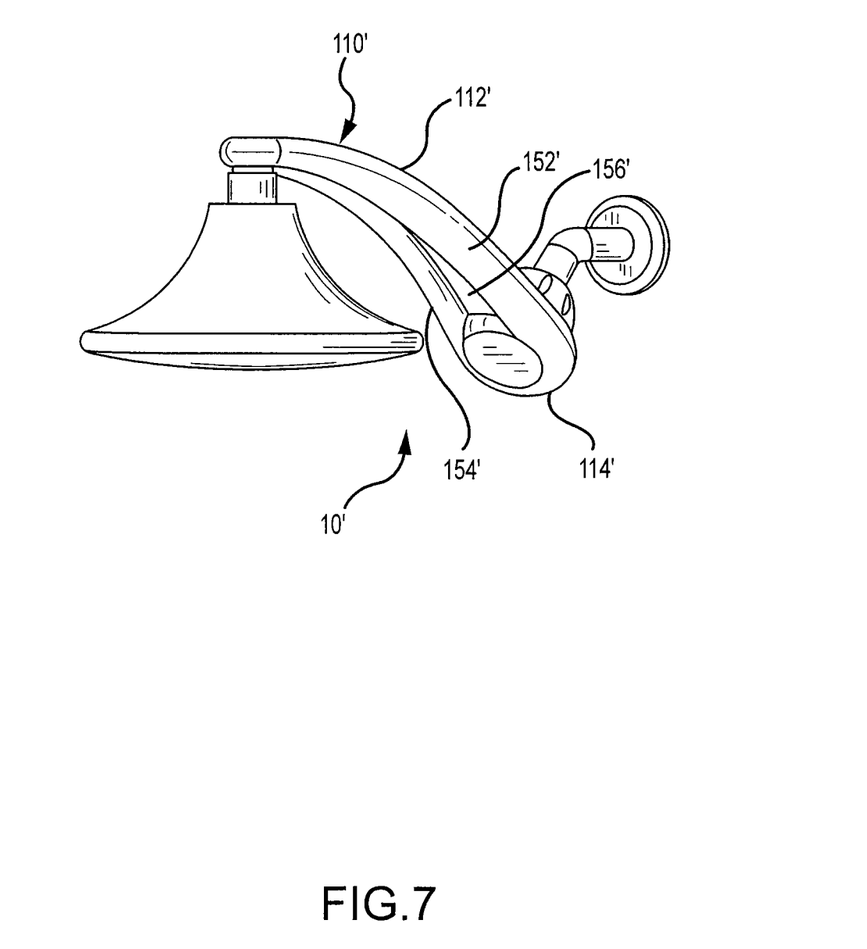
FIG. 7 is a perspective view of another example of a showerhead assembly including a different arm.

FIG. 7 illustrates another example of a showerhead assembly 10' including a different molded arm body 110'. The molded arm body 110' may include a first arm portion 152', a second arm portion 154' and a recessed portion 156' disposed between the first and second arm portions 152', 154'. The recessed portion 156' may be part of a first body portion 112' or part of a second body portion 114' that may be assembled to form the molded arm body 110', for example, when the molded arm body 110' is not monolithic. As discussed above, a fluid passage may be defined in the molded arm body 110'. In particular, a fluid passage may be defined in one or both of the first and second arm portions 152', 154'.

Thus, the molded arm body 110' may not only provide a different aesthetic appearance from the molded arm body 110 of FIG. 1, but also provide a different functionality of multiple fluid passages connecting the inlet to the outlet. It should be understood that the outlet may be configured to provide separate communication paths from each of the fluid passages, for example, to allow fluid path selection in the showerhead 200', as described in the incorporated patent application Ser. No. 11/669,132.

Figure 8:
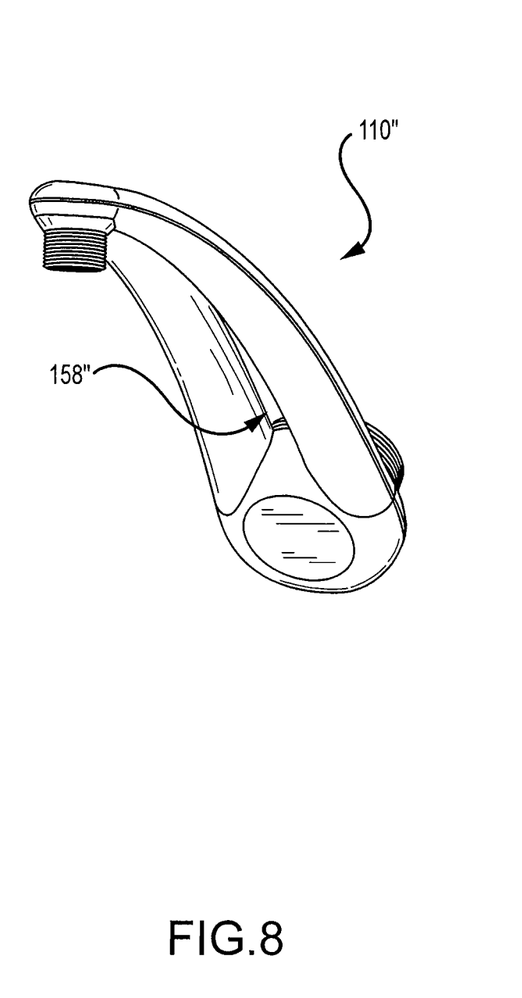
FIG. 8 is a perspective view of another example of an arm.

FIG. 8 illustrates another example of a molded arm body 110", which may be similar to the molded arm body 110' of FIG. 7. However, the molded arm body 110" may include a space 158", rather than the recessed portion 156' shown in FIG. 7.

It should be understood from FIGS. 7 and 8 that the recessed portion may include one or more such spaces, for example, to alter the aesthetic appearance of the molded arm body. For example, one or more spaces in the recessed portion may define a pattern or artful design.

Figure 9:
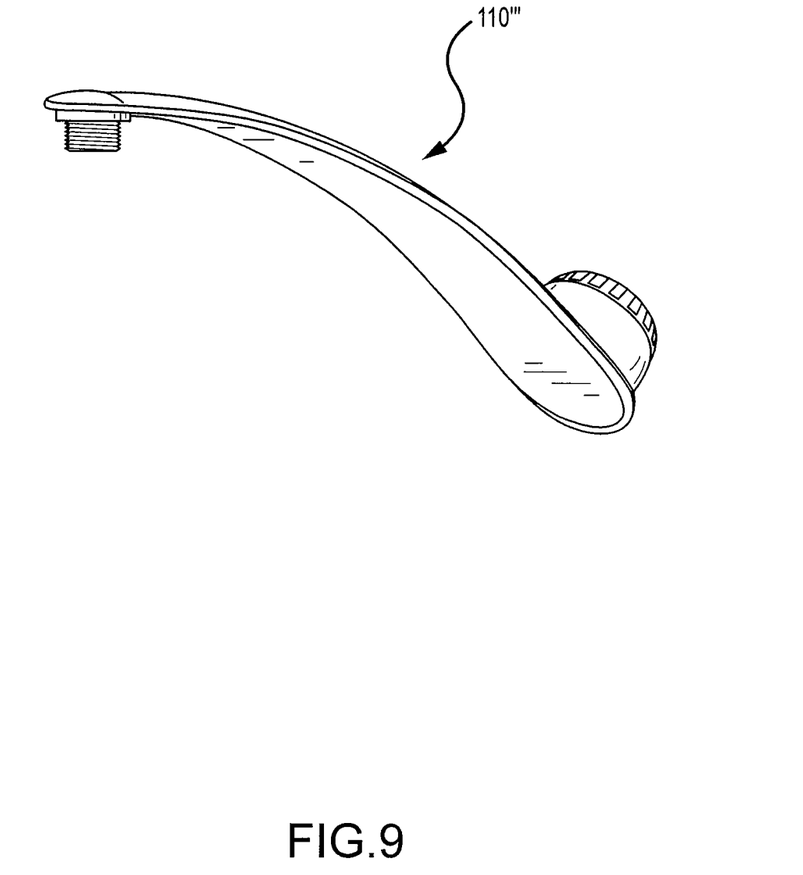
FIG. 9 is a perspective view of another example of an arm assembly including a different arm.

FIG. 9 illustrates another example of a molded arm body 110''' including a different molded arm body 110''''. The molded arm body 110''' may include a relatively wide flat channel. Such a configuration may allow a relatively thinner design of the molded arm body, such as shown, while providing sufficient fluid flow therethrough. For example, the entire internal body width and/or height of the molded arm body may be used to define the fluid passage through the molded arm body.

Although the present invention has been described with reference to particular embodiments, persons skilled in the art will recognize that changes may be made in form and detail without departing form the spirit and scope of the disclosure. In particular, modifications such as reversal of the mechanical parts shown or omission of features from parts and inclusion on other parts is fully contemplated.

What is claimed is:

1. An arm for connecting a showerhead to a fluid supply pipe, comprising
   a molded arm body that defines
      an outer wall;
      an inlet within the outer wall configured for connection with the fluid supply pipe,
      an outlet within in the outer wall configured for connection to the showerhead,
      a first interior passage defined in part by the outer wall, and
      a second interior passage defined in part by the outer wall, wherein
   the first interior passage provides fluid communication between the inlet and the outlet; and
   the second interior passage is a void space not in fluid communication with the inlet and the outlet.

2. The arm of claim 1, wherein the molded arm body comprises a monolithic arm body.

3. The arm of claim 1, wherein the molded arm body further comprises an attachment feature around at least one of the inlet or the outlet 4. The arm of claim 1, wherein a water flow from the fluid supply is configured to flow directly within the first interior passage.

5. The arm of claim 1, wherein the molded arm body comprises
   a first molded body portion; and
   a second molded body portion, wherein the first molded body portion and the second molded body portion are operably connected together to form a watertight seal around an outer perimeter of the molded arm body.

6. The arm of claim 5, wherein the first interior passage and the second interior passage are defined by a structure formed on an inner surface of at least one of the first molded body portion or the second molded body portion.

7. The arm of claim 6, wherein the first interior passage and the second interior passage are defined when the first molded body portion and the second molded body portion are joined together to form the molded arm body.

8. The arm of claim 1, wherein the molded arm body further comprises at least one molded exterior feature selected from the group consisting of a texture, a faux joint, a pattern, and an art design.

9. An arm assembly for connecting a showerhead to a fluid supply, the arm assembly comprising:
    a molded arm body that defines
        a housing;
        an inlet formed in the housing and configured for connection with the fluid supply,
        an outlet formed in the housing and configured for connection to the showerhead,
        a first interior passage defined in part by the housing, and
        a second interior passage defined in part by the housing, wherein
        the first interior passage provides fluid communication between the inlet and the outlet,
        the second interior passage defines a void space within the arm body; and
        water flow from the fluid supply flows directly against an inner surface of the housing forming part of the first interior passage; and
    a separate attachment component configured to couple with the molded body and to engage a structure connected to a fluid supply.

10. The arm assembly of claim 1, wherein the separate attachment component is configured to movably connect with the inlet of the molded arm body to allow selective adjustment of a position of the molded arm body relative to the structure connected to the fluid supply.

11. The arm assembly of claim 10, wherein the separate attachment component comprises a pivot ball.

12. The arm assembly of claim 11, wherein the pivot ball includes a threaded bore configured to engage a threaded pipe as the structure connected to the fluid supply.

13. The arm assembly of claim 11, further comprising a removable collar configured to fasten to the inlet of the molded arm body to provide resistance to movement of the molded arm body relative to the pivot ball.

14. The arm of claim 6, wherein the structure is a sidewall extending from the inner surface of at least one of the first molded body portion or the second molded body portion, where one side of the sidewall defines the void space.

15. A shower arm for fluidly connecting a showerhead to a shower pipe comprising
    a first shell formed monolithically with a first outer perimeter wall and a first internal sidewall defining a first channel; and
    a second shell formed monolithically with a second outer perimeter wall and a second internal sidewall defining a second channel and configured to mate with the first shell, wherein
    the first shell and second shell are connected to a form seal therebetween; and
    the first sidewall and the second sidewall are aligned and connected in a fluid-tight seal to combine the first channel and the second channel and thereby define an interior fluid passageway and a spacing channel between the first and second internal sidewalls and the first and second perimeter walls.

16. The shower arm of claim 15, wherein
    the first internal sidewall has a first surface that defines the first channel and a second surface that defines a first spacing channel;
    the second internal sidewall has a third surface that defines the second channel and a fourth surface that defines a second spacing channel; and
    when the first shell and the second shell are connected together, the first spacing channel and the second spacing channel are mated to define the spacing channel between the first shell and the second shell.

17. The shower arm of claim 16, wherein the interior fluid passageway diverges into two separate passageways.

18. The shower arm of claim 15, wherein
    the first shell defines a tongue along an outer perimeter;
    the second shell defines a groove along an outer perimeter; and
    when the first shell is operably connected to the second shell, the tongue is received within the groove.

19. The shower arm of claim 15, wherein the first internal sidewall extends upwards from an inner portion of the bottom surface of the first shell and the second internal sidewall extends upwards from an inner portion of the bottom surface of the second shell.

20. The shower arm of claim 15, wherein at least a portion of the first internal sidewall forms at least a portion of an outer wall of the first shell and at least a portion of the second sidewall forms at least a portion of an outer wall of the second shell.

21. The arm of claim 1, wherein
    the first interior passage is defined in part by a first internal sidewall and the outer wall; and
    the second interior passage is defined in part by a second internal sidewall and the outer wall.

* * * * *